Nov. 8, 1960   G. H. PRIMEAU   2,959,067
TRANSMISSION CONTROL LEVER BEARING
Filed April 4, 1957   2 Sheets-Sheet 1

INVENTOR.
George H. Primeau
BY
W. C. Middleton
ATTORNEY

Nov. 8, 1960                G. H. PRIMEAU                2,959,067
                   TRANSMISSION CONTROL LEVER BEARING
Filed April 4, 1957                                2 Sheets-Sheet 2
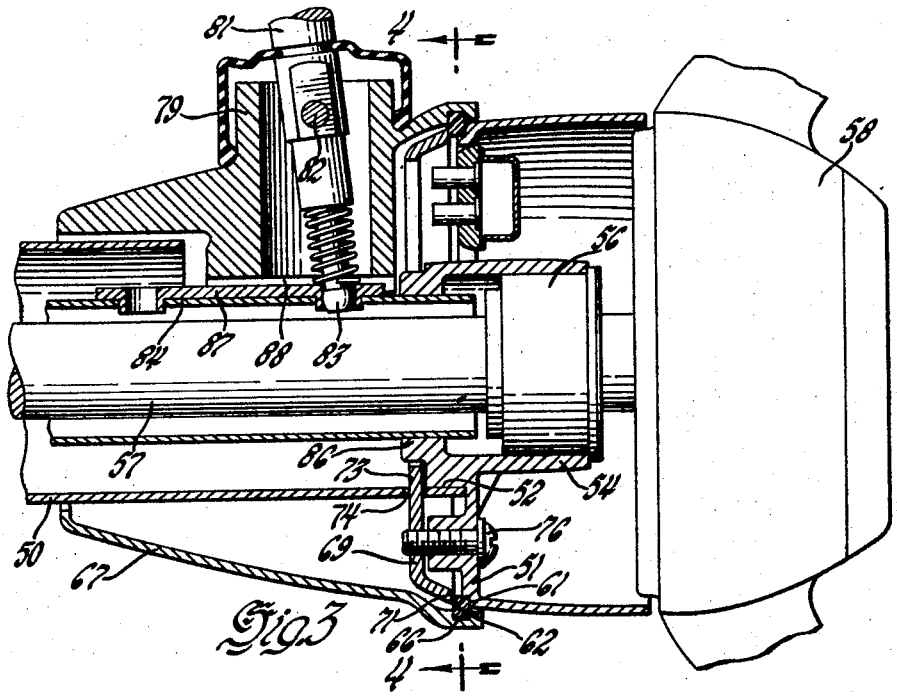
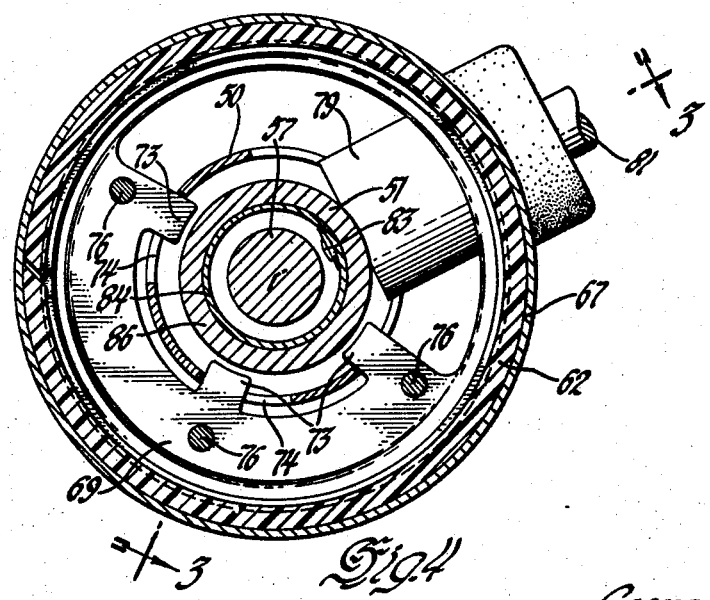
INVENTOR.
George H. Primeau
BY
W. C. Middleton
ATTORNEY _United States Patent Office_

2,959,067
Patented Nov. 8, 1960

2,959,067

TRANSMISSION CONTROL LEVER BEARING

George H. Primeau, Grosse Pointe Farms, Mich., assignor to General Motors Corporation, Detroit, Mich., a corporation of Delaware Filed Apr. 4, 1957, Ser. No. 650,609

18 Claims. (Cl. 74—484)

This invention relates to a control mechanism and, more particularly, to a transmission control linkage mounted on the steering column of a vehicle.

In transmission control linkages mounted on the steering column of a vehicle, it has been the practice to provide a rotatable bowl located just below the steering wheel and having connected to the bowl by a spider assembly an inner hub which is rotatably mounted by a bearing of the plane or thread type on the steering column. This bearing construction, due to the small diameter of the bearing, requires an expensive construction in order to provide sufficient stability for the bowl assembly, since the forces acting on the bowl assembly act through a large lever arm or distance from the bearing and tend to tilt the bowl assembly.

The applicant proposes to eliminate this inner bearing assembly and to provide a large diameter annular bearing ring preferably made of plastic, such as nylon or fiber supported on the steering column assembly and fitting into an annular recess in the internal surface of substantially the largest diameter portion of the bowl. This will provide a large diameter bearing surface for the bowl substantially in axial alignment with the pivot point for the hand lever. The large diameter bearing will provide increased stability due to the increased bearing diameter and because the force moment acting on the bearing is greatly reduced due to the smaller lever arm between the point of application of the forces the forces on the bearing and the pivot point of the hand lever on the bowl.

An object of the invention is to provide in a transmission control linkage mounted on a steering column, an annular bearing ring rotatably mounted in a groove in the substantially largest diameter portion of the bowl assembly which supports the hand lever.

Another object of the invention is to provide a transmission control mechanism mounted on a steering column, a simplified bearing ring construction employing an expandable ring secured to the column and fitting in a recess in an internal surface of the bowl assembly.

Another object of the invention is to provide in a control linkage mechanism on a support, an annular bearing supporting a rotatable housing having a lever pivoted to the housing having one portion of the bearing located substantially in axial alignment with the pivot point for the lever.

These and other objects of the invention will be more clearly understood from the following description and drawing showing the preferred embodiments of the invention.

Figure 3 is a view partially in section of a modification.

Figure 4 is a sectional view of Figure 3 on the line 4—4.

Figure 1:
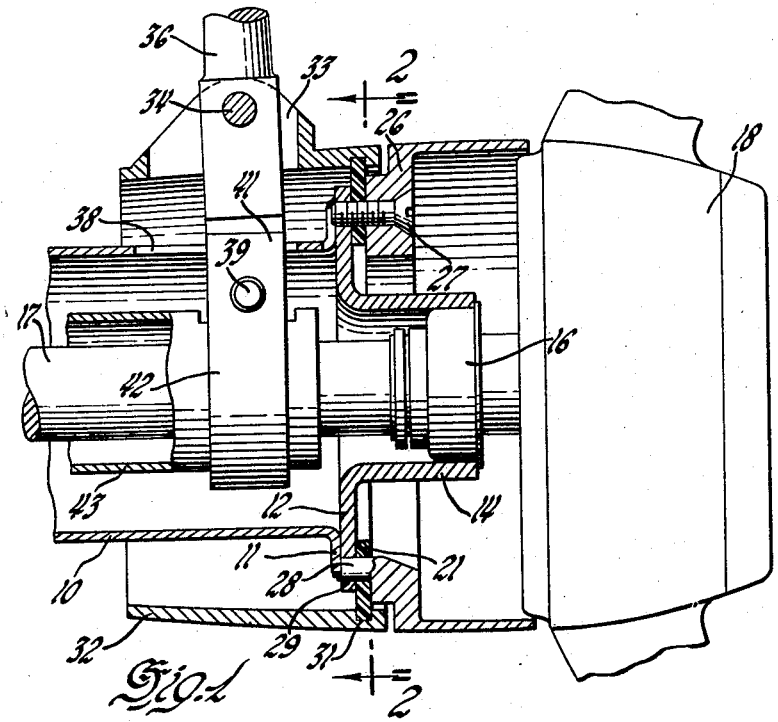
Figure 1 is a view partially in section showing the control linkage mounted on a steering column.
Figure 2:
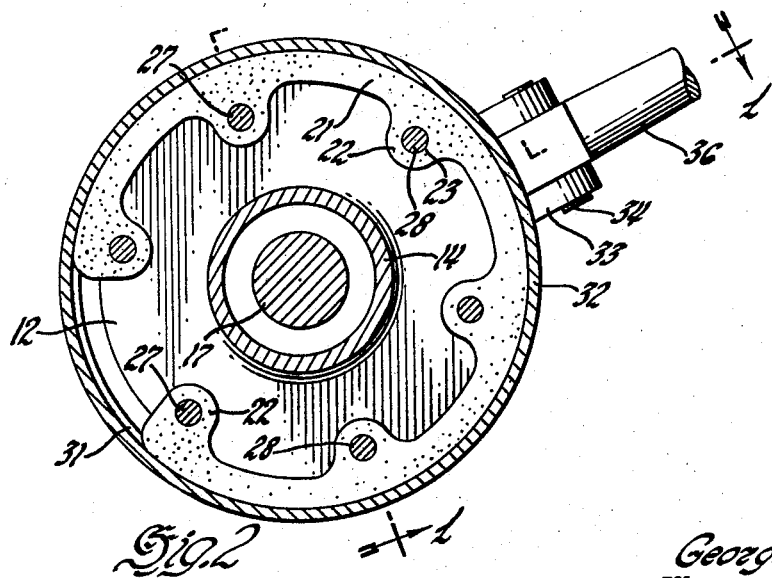
Figure 2 is a sectional view on the line 2—2 of Figure 1

The invention is illustrated in connection with a transmission control system mounted on a steering column assembly including a steering column 10 which provides a support for the assembly and has a flange 11 at the upper end suitably welded to the radial flange 12 of the bearing support sleeve 14. Sleeve 14 supports the bearing 16 for the steering shaft 17 having a steering wheel 18 attached to the upper end.

The bearing ring 21 is made preferably of the suitable plastic bearing material such as nylon or fiber to provide quietness of operation but may be made of metal. The ring is split for ease of assembly and is compressible for insertion and expansion into bearing groove 31. The ring 21 has a plurality of internally extending projections 22 having apertures 23 therein for securing and locating the ring upon the steering column assembly. The ring 21 is positioned upon the radial flange 12 and secured between this flange and another portion of the column assembly, such as a turn signal housing 26 which is secured to the flange 12 by fastening means such as screws 27, and has projections 28 fitting in other apertures 23 in ring 21 and in suitable apertures 29 in the flange 12 to locate the bearing ring. The flange 12 and the housing 26 clamp a portion of the ring above the complete circumference of the ring to positively secure the ring and to give it greater rigidity. The outer circular surface of the ring fits in an annular bearing groove 31 in the internal surface of the bowl 32. The bowl is a simple shell housing which may be tapered to provide a fairing between the large diameter steering wheel hub or signal switch housing 26 and the column 10. The bowl 32 provides a rotatable support for the hand lever 36 and has a small tubular extension 33 extending radially and supporting a pivot pin 34 for the hand or operating lever 36 which extends through the aperture in the bowl wall formed by the tubular extension 33 and through the aperture 38 in the column 10. The inner end of the hand lever 36 is connected by a pivot pin 39 to the tines 41 located on each side of lever 36 of the connecting collar 42 which is secured to the control tube 43.

The hand lever 36 when moved axially along the steering column pivots on pin 34 and through pin 39 moves the control tube 43 axially of the steering column 10. If the control tube 43 has pure axial movement some play is provided at the pivot pin 39 or if slight lateral movement of the control tube 43 is permitted, pivot pin 39 may have a close fit. Rotary movement of the hand lever 36 about the steering column 10 rotates the bowl 32 and the control tube 43 in unison. It will be seen that the bearing ring 21 permits a simplified bowl assembly construction and provides a bearing surface having a radius or lever arm substantially equal to or even greater than the lever arm between the central axis of the bearing surface and the pivot pin 34. Thus the axial forces resulting from axial movement of hand lever 36 act through substantially the same lever arm on the bearing and the force tending to tilt the bowl assembly 32 on the bearing is not multiplied by leverage.

The modified form of the invention shown in Figure 3 has a mast jacket or steering column 50 which supports a housing member 51 having an internal partial annular surface 52 fitting within the column shaft to locate the housing thereon and a sleeve extension 54 supporting the bearing 56 for the steering shaft 57 and conventional steering wheel 58 secured thereto. The housing 51 has at its lower outer end a square re-entrant groove 61 to receive the inner edge of the bearing ring 62. This ring is split or continuous and has a large diameter but a small width and is made of suitable plastic material such as nylon which provides sufficient flexibility so that the exterior edge of the ring may be compressed and will expand to fit into the recess 66 in the internal surface of the bowl 67. Then the ring 62 is secured in the groove 61 in housing 51 by a clamping plate 69 which has at its outer diameter an annular radial surface 71 which engages the inner portion of the lower surface of the ring 62 and clamps it in the groove 61. The clamping plate also has several inwardly extending tongues 73 which are slipped into bayonet slots 74 having an L shape and then rotated into the horizontal or circumferential portion of these slots to anchor the tongues 73 to the column 50. The screws 76 or other fastening means extend through the housing 51 and are threaded into the clamping plate 69 and are tightened to secure the housing 51 to the top of column 50 and to clamp the bearing ring 62 between the surface 71 on the clamp and the recess 61 on housing 51.

The bowl 67 has a transverse tubular portion 79 providing an aperture extending through the bowl for the hand lever 81 which is pivoted by pin 82 located substantially in axial alignment with a portion of bearing ring 62 to reduce the radial lever arm between the bearing ring and the pin 22. The inner end of the hand lever 81 has a ball joint connection 83 with the control tube 84. The control tube 84 is axially slidably supported by the bearing surface 86 of housing 51 and rotatably connected with the bowl 67 by the key 87 fixed to the control tube and the keyway 88 on the bowl which permit relative axial movement.

In this modification when the hand lever 81 axially pivots about pin 82, the inner end of the lever through ball joint 83 reciprocates the control tube 84 axially. When the hand lever 81 is rotated about the axis of the steering column, the pin 82 rotates the bowl assembly 67 and the keyway 88 and key 87 rotate the control tube 84 with the bowl. Since the bowl is supported on the large diameter bearing ring 62 which is in substantially axial alignment with the pivot pin 82 for the hand lever 81, the moment on the bearing assembly is substantially reduced since the radial lever arm between the pin 82 and the axis is substantially equal to the lever arm between bearing 62 and the axis.

The above described embodiments, are illustrative of the invention and it will be appreciated by those skilled in the art that various modifications may be made within the scope of the appended claims.

I claim:

1. In a transmission control linkage assembly, support means having an annular portion providing an annular surface, clamp means having an annular surface facing said first-mentioned annular surface, an annular housing located coaxially of said annular surfaces and having in its internal surface an annular bearing groove, an annular bearing ring having its radially outer edge portion fitting in said bearing groove to rotatably support said annular housing and its radially inner edge portion located between said annular surfaces on said support means and said clamp means, and securing means to secure said support means and clamp means together to clamp said bearing ring therebetween in a fixed position in freely rotating bearing engagement with the base of said bearing groove.

2. The invention defined in claim 1 and said bearing ring being split and contractable for insertion in said annular housing and expandable into said bearing groove and clamped by said securing means to secure said support means and clamp means together in said expanded position to positively position and hold said bearing ring rigid.

3. The invention defined in claim 1 and said bearing ring being made of plastic sufficiently flexible for insertion in said bearing groove and said support means and clamp means including means supporting said bearing ring to positively position and hold said flexible bearing ring rigid in circular form.

4. In a control linkage, an annular housing having an annular internal surface with an annular internal groove, a plastic bearing ring having a relatively large mean diameter and small width and being sufficiently laterally flexible for insertion in said groove, said bearing ring having a radially outer annular portion located in said groove with the outer circumference closely fitting in freely rotating bearing engagement the base of said groove and having a radially inner annular portion located out of said groove and within said annular internal surface, and a support having annular clamp means engaging substantially all of said inner annular portion of said bearing ring to fix said bearing ring to said support and to make said bearing ring laterally rigid.

5. The invention defined in claim 4 and said bearing ring being split and contractable for insertion into said annular housing and expandable into said internal groove.

6. The invention defined in claim 4 and said bearing ring being held in position by dowels on said support.

7. In a transmission control assembly, a support including a column and an annular member extending outwardly from said column, clamp means, a bearing ring located between said annular member and said clamp means having a substantially annular portion extending outwardly from said annular member and clamp means, means to secure said clamp means to said support to clamp said bearing ring to said annular member to hold said bearing ring rigid and in a fixed position, an annular housing spaced from said column and closely surrounding said annular member having an annular recess in an internal surface fitting on said bearing ring in said fixed position in freely rotating bearing engagement with the base of said annular recess to provide a large diameter bearing to rotatably support said housing on said column, a control lever pivotally mounted on said housing at a point spaced from the central axis of said housing and substantially in axial alignment with a portion of said bearing recess, a control tube located axially within said column, and means connecting said hand lever to said control tube to axially reciprocate said control tube during axial pivotal movement of said hand lever and to rotate said control tube with said housing and hand lever during rotary movement of said hand lever.

8. The invention defined in claim 7 and said bearing ring being split and contractable for insertion into said annular housing and expandable into said annular recess and clamped in position by said clamp means.

9. The invention defined in claim 7 and said bearing ring being a complete uninterrupted ring made of plastic sufficiently laterally flexible and narrow to be inserted in said annular recess, said annular member having a backing surface means to engage the inner edge of said ring to hold said ring in circular form, and said clamp means and said support clamping said ring to rigidly position said ring in circular form against said backing surface means to rigidify and hold said ring in freely rotating bearing engagement with the base of said annular recess to rotatably support said housing.

10. In a transmission control assembly, a support including an annular member coaxially located with respect to the axis of said support, a clamp member having a clamping portion, a bearing ring located between said annular member and said clamping portion having a substantially annular surface extending outwardly from said annular member and clamping portion, means to secure said clamp to said support to clamp said bearing ring coaxially to said support, an annular housing having an annular recess in an internal surface fitting on said bearing ring and said annular recess having a bottom surface in freely rotating bearing engagement with the edge of said bearing ring to rotatably support said housing, and a control lever pivotally mounted on said housing at a distance from the axis of said support substantially equal or less than the radius from the axis of said support of said bearing ring.

11. In a transmission control assembly, a column, a support extending outwardly from the axis of said column having a substantially annular face, anchor means on said column, interengaging means on said column and support to stop relative movement of said support toward said anchor means, clamp means having a substantially annular face opposing said annular face of said support and engaging said anchor means to position said clamp means on said column, a bearing ring located between said annular faces on said support and said clamp means having a substantially annular portion extending outwardly from said support and clamp means, means to secure said clamp means to said support means to clamp said bearing ring to said support and said support to said column, and an annular housing having an annular recess in an internal surface fitting on said bearing ring.

12. In a transmission control assembly, a column, a support extending outwardly from the axis of said column having a substantially annular face, anchor means on said column, interengaging means on said column and support to stop relative movement of said support toward said anchor means, clamp means having a substantially annular face opposing said annular face of said support and engaging said anchor means to position said clamp means on said column, a flexible plastic bearing ring located between said annular faces on said support and said clamp means having a substantially annular portion extending outwardly from said support and clamp means, means to secure said clamp means to said support means to clamp said bearing ring to said support and said support to said column and to make the bearing ring rigid, an annular housing having an annular recess in an internal surface fitting on said bearing ring, and said bearing ring normally being sufficiently flexible for insertion and removal from said recess.

13. In a transmission control assembly, a column, a support extending outwardly from the axis of said column having a substantially annular face, a bayonet slot extending from the end of said column and having a lateral portion spaced from the end of said column, interengaging means on said column and support to stop relative movement of said support toward said lateral portion, clamp means having a substantially annular face opposing said annular face of said support and having a portion anchored in said lateral portion to position said clamp means on said column, a bearing ring located between said annular faces on said support and said clamp means having a substantially annular portion extending outwardly from said support and clamp means, means to secure said clamp means to said support means to clamp said bearing ring to said annular support and said support to said column, and an annular housing having an annular recess in an internal surface fitting on said bearing ring.

14. In a transmission control assembly, a column, a support extending outwardly from the axis of said column having a substantially annular face, anchor means on said column, interengaging means on said column and support to stop relative movement of said support toward said anchor means, clamp means having a substantially annular face opposing said annular face of said support and engaging said anchor means to position said clamp means on said column, a flexible plastic bearing ring located between said annular faces on said support and said clamp means having a substantially annular portion extending outwardly from said support and clamp means, means to secure said clamp means to said support means to clamp said bearing ring to said support and said support to said column, an annular housing having an annular recess in an internal surface fitting on said bearing ring, said bearing ring being sufficiently flexible for insertion in said recess, a control lever pivotally mounted on said housing substantially in axial alignment with said bearing recess, a control tube located axially within said column, and means connecting said hand lever to said control tube to axially reciprocate said control tube during axial pivotal movement of said hand lever and to rotate said control tube with said housing during rotary movement of said hand lever.

15. In a transmission control assembly, a support including a substantially annular member, a clamp member having a substantially annular clamping portion, a bearing ring located between said annular member and said clamping portion having a substantially annular outer edge portion extending radially outward from between said annular member and clamping portion, means to secure said clamp to said support to clamp said bearing ring coaxially to said support, an annular housing having an annular recess fitting on said annular outer edge portion of said bearing ring and said annular recess having a bottom surface in freely rotating bearing engagement with the outer edge of said bearing ring to rotatably support said housing on said support, and a control lever pivotally mounted on said housing at a distance from said axis substantially equal or less than the radius from the axis of said support of said annular outer edge portion of said bearing ring.

16. In a transmission control assembly, a column, a support having a substantially annular face located transversely of the axis of said column, anchor means on said column, interengaging means on said column and support to stop relative movement of said support toward said anchor means, clamp means having a substantially annular face opposing said annular face of said support and engaging said anchor means to position said clamp means on said column, a flexible plastic bearing ring having one substantially annular portion located between said annular faces on said support and said clamp means having another substantially annular portion extending from between said support and clamp means, means to secure said clamp means to said support means to clamp said bearing ring to said support and said support to said column, an annular housing having an annular recess fitting on said another portion of said bearing ring, said bearing ring being sufficiently flexible for insertion in said recess, a control lever pivotally mounted on said housing substantially in axial alignment with said bearing recess, a control member located axially of said column, and means connecting said hand lever to said control member to axially reciprocate said control member during axial pivotal movement of said hand lever and to rotate said housing during rotary movement of said hand lever.

17. In a transmission control assembly, a support including a small diameter tubular portion, and a large diameter tubular portion, both arranged substantially concentric with respect to the axis of said support, an annular housing located concentrically with respect to the axis of said support having an outer surface having a diameter substantially the same as the diameter of said large diameter tubular portion located concentric with an axially closely adjacent said large diameter tubular portion and an internal surface having a large diameter slightly less than the large diameter of said large diameter tubular portion but substantially greater than the small diameter of said small diameter tubular portion, said internal surface having an annular groove, said support also having an intermediate portion located between said large and small diameter portions of said support having an annular surface located concentrically with the axis of said support having an outer diameter just fitting within the inner diameter of said annular housing, a ring member contacting said annular surface and extending outwardly beyond said annular surface and into said annular groove in freely rotatable bearing engagement with the base of said annular groove to freely rotatably support said annular housing substantially at its full diameter, and said support including clamping means to hold said ring in contact with said annular surface in a fixed position in circular form on said support concentric with the axis of said support.

18. The invention defined in claim 17, a hand lever pivotally mounted on said annular housing at a point at a radial distance from the axis of said support not substantially greater than the radial distance from said axis to the outer edge of said bearing ring.

References Cited in the file of this patent

UNITED STATES PATENTS

| | | |
|---|---|---|
| 1,095,839 | Fritz | May 5, 1914 |
| 1,821,942 | Marles | Sept. 8, 1931 |
| 2,320,878 | Manning | June 1, 1943 |
| 2,456,355 | Aber | Dec. 14, 1948 |
| 2,712,952 | Lundgren | July 12, 1955 |
| 2,760,382 | Bliss | Aug. 28, 1956 |
| 2,774,508 | Larsen | Dec. 18, 1956 |
| 2,792,719 | Lanzone | May 21, 1957 |
| 2,814,538 | Connolly | Nov. 26, 1957 |
| 2,855,229 | Winslow | Oct. 7, 1958 |